INVENTORS
Edgar Von Rüdgisch
Erich Cziudaj, Deceased
By Irmgard Cziudaj, Executrix BY
Raymond Wooster

United States Patent Office 3,260,143
Patented July 12, 1966

3,260,143
APPARATUS FOR STORING BOLTS OF CLOTH AS WELL AS PAYING OUT OR SPREADING, MEASURING AND CUTTING LENGTHS THEREFROM
Edgar von Rüdgisch, 10 Schinkelstrasse, Cologne-Braunsfeld, Germany, and Erich Cziudaj, deceased, late of Cologne-Bayenthal, Germany, by Irmgard Cziudaj, executrix and legal representative of minors, 2 Bruhler Landstrasse, Cologne-Bayenthal, Germany
Filed Aug. 14, 1963, Ser. No. 302,215
Claims priority, application Germany, Aug. 16, 1962, R 33,336
33 Claims. (Cl. 83—86)

In the cloth-working industry, the clothing industry and the upholstered furniture industry, very many different kinds of cloth with different patterns and in different colours are used. Assortments up to several hundred bolts or pieces are possible. Consequently it is necessary to store bolts of different kinds of textiles so that they take up the least possible space and at the same time to arrange them so that they can be brought to a cutting table along the shortest path without expenditure of much time and energy.

For storing bolts of cloth, storage drums are known which are about 3.25 metres high and hold up to 24 bolts of cloth. Several such drums have already been installed and used for feeding a common cutting table. However, considerable time is required to bring the cutting table to the different storage drums or the webs of cloth from the individual storage drums to the cutting table. Moreover the space of a workshop is badly utilized because the height of the shop is determined by the diameter of the storage drums and consequently the height of the room which must of necessity exist but is not utilizable over the cutting table is lost.

In combination with cutting tables, storage devices have already been used from which lengths of cloth can be laid on the cutting table, measured and cut. The known devices are, however, so constructed that the cloth web has to be introduced by hand, for which two workers are required. Two workers are also necessary laying the cloth webs from a storage drum.

Another objection to the known paying out or spreading machines is that they lay the cloth to the right and to the left. Consequently it is more difficult to examine the cloth to detect faults in weaving because knots and the like occurring on one side are frequently not detectable on the other side.

The object of the invention is to take all problems into consideration, while saving space and to solve them automatically or semiautomatically. According to the invention the bolts of cloth are stored on a known circulating conveyor and fed to the paying out or spreading machine by a selected signal of a controlling device. The end of the cloth web is clamped on the cutting table, pulled off the bolt by the paying out machine, the circulating conveyor participating in the movement, and is laid on the table. The paying out or spreading machine and the circulating conveyor are automatically stopped before an adjustable length of cloth is measured, whereupon the length is cut and the paying out machine with the circulating conveyor gate are automatically returned into their initial position (zero position) on the table. The drive of the circulating conveyor, paying out machine, knife and so forth are controlled by electric means.

For carrying out this method an apparatus is used which comprises a circulating conveyor, a cutting table and a paying out or spreading machine running on the latter. The novel feature consists in that the circulating conveyor is constructed as a storage portal mounted on two vertical supports with a longitudinal girder and the cutting table is arranged in the direction of feed of the circulating conveyor under the longitudinal girder between the supports, the drives of the circulating conveyor and the paying out machine being electrically coupled. Further details of the invention will become apparent from the following description of an apparatus illustrated diagrammatically by way of example in the accompanying drawings, in which.

Figures 1, 21:
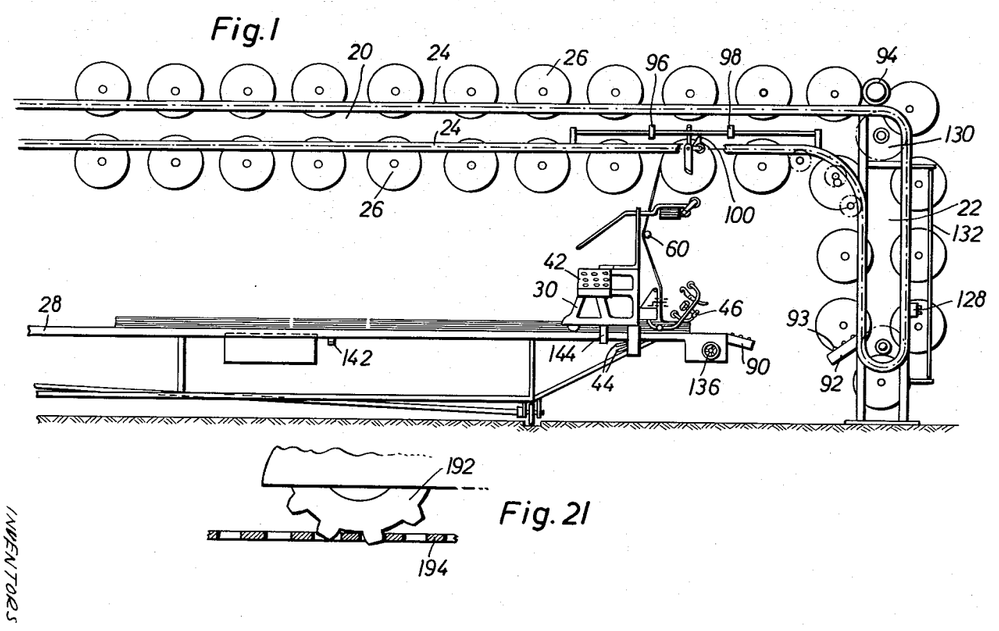
FIG. 1 is an elevation of one side of the apparatus.
FIG. 21 is a side elevation showing the guiding means for the paying out or spreading machine on the cutting table.

The circulating conveyor illustrated in FIG. 1 consists of a longitudinal girder 20 with vertical side supports 22 at its ends. Chains 24 run on both sides of the circulating conveyor and carry the separate cloth bolts 26. Underneath or within the circulating conveyor the cutting table 28 with the paying out or spreading machine 30 shiftable thereon is arranged and will now be described in detail with reference to FIGS. 2, 5 and 21.

The paying out or spreading machine 30 has on its front end a guide 32 for a knife carriage 34 in which a knife 36 rotates. The knife carriage 34 can be moved up and down by hand, by means of a chain drive 38 through the intermediary of a hand wheel 40. It is also contemplated to control the chain drive automatically so that the knife carriage 34 will always be raised after the cutting of a cloth length by a distance equal to the thickness of the cloth. The spreading machine 30 has a switch box 42 provided with a number of switching elements and control buttons. The switch box 42 is connected by cables 44 with other control mechanisms of the apparatus. On an arm 45 fixed on the knife carrier 34, a bow 46 is mounted so that it can swing about a pivot 48 and can be clamped in an operative position by a latch 50. The bow 46 carries an upper pressure roller 52 and a lower pressure roller 54 loaded by a spring 56. The two rollers 52 and 54 bear against the cloth web 58 which is pulled off from a bolt 26 over a guide roller 60 mounted near the upper end of the spreading machine 30. Just above the knife carriage 34 the cloth web 58 runs along a guide surface 62.

Figure 2:
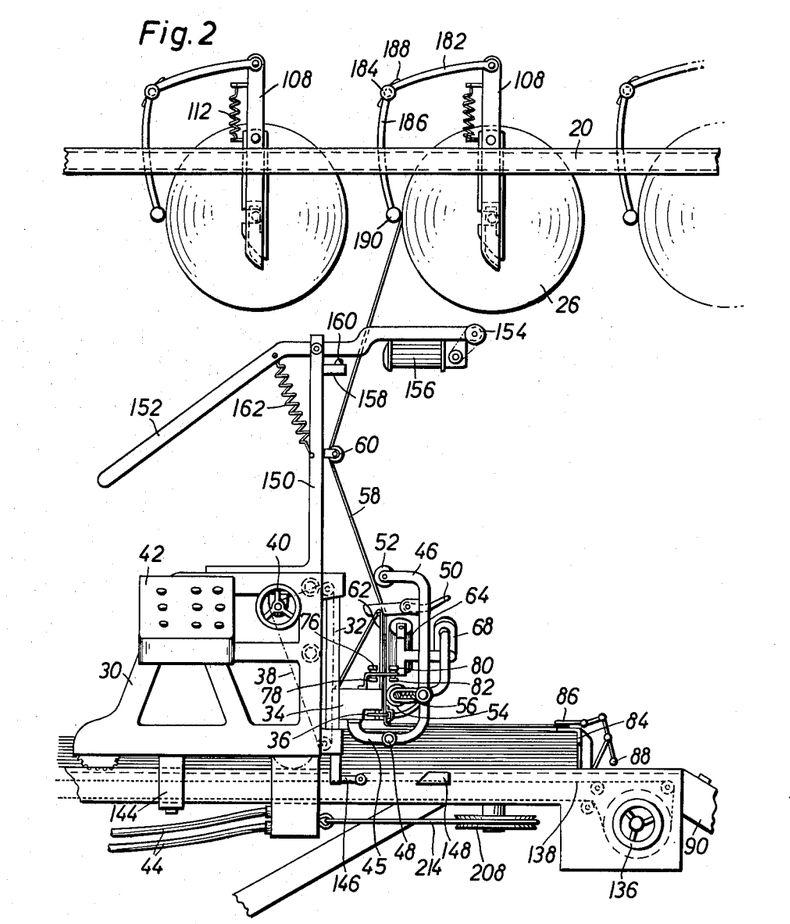
FIG. 2 shows a section of the apparatus with a web of fabric being pulled off a cloth bolt carried by the circulating conveyor by the paying out or spreading machine on the cutting table.
Figure 5:
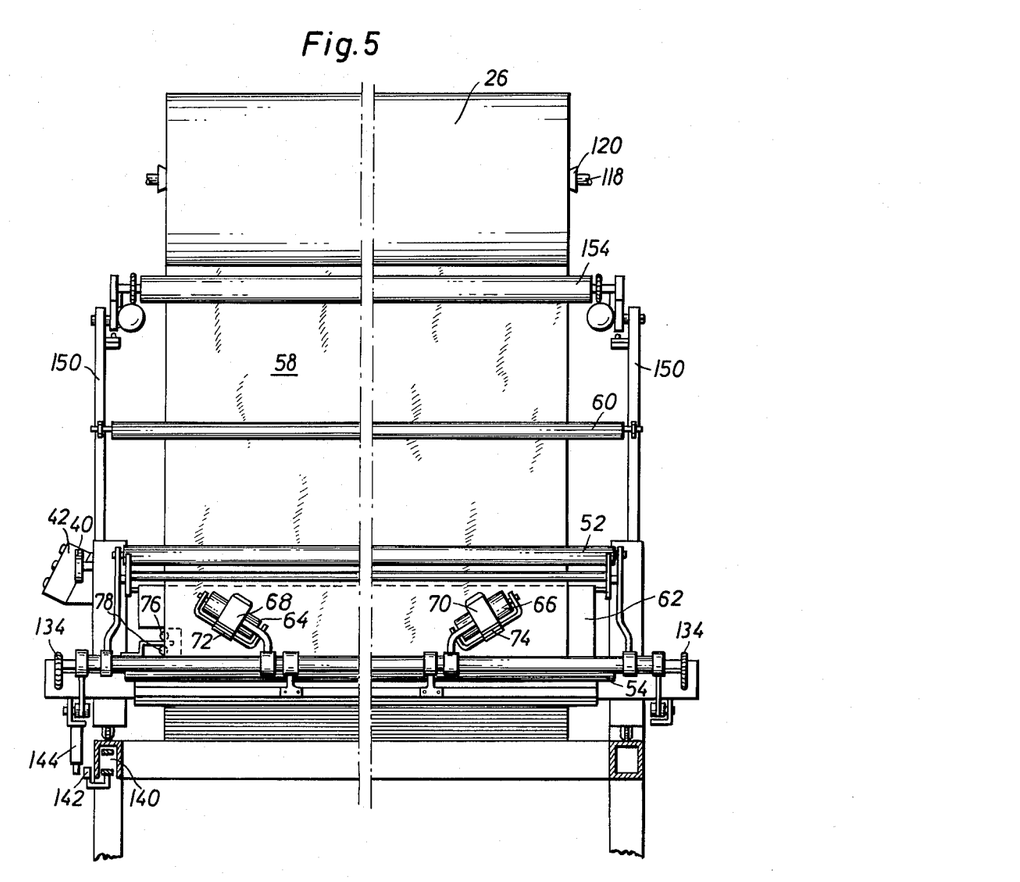
FIG. 5 shows the paying out or spreading machine in front elevation.

The pressure rollers 64 and 66 (FIG. 5) are arranged at an angle to the direction of feed of the cloth web 58 and are controlled by magnets 68 and 70. FIGS. 2 and 5 show the pressure rollers 66 and 68 in inoperative position. In operative position the rollers 64 and 66 can each be pressed against the cloth web 58, the roller 64 by the magnet 68 through the intermediary of the rocker 72 and the roller 66 by the magnet 70 through the intermediary of a similar rocker 74. The pressure rollers 66 and 68 are operated independently of each other for reasons to be explained later.

On the left hand edge (FIG. 5) of the cloth web 58 two photoelectric cells 76 and 78 are arranged side by side and also displaced in relation to each other in vertical direction, and opposed thereto, on the other side of the cloth web 58, are lamps 80 and 82, as shown in FIG. 2. The photoelectric cells 76 and 78 are so wired that the inner photoelectric cell 76 responds to light and the outer photoelectric cell 78 to dark. The photoelectric cell 76 is connected to the magnet 68 and the phototelectric cell 78 to the magnet 70. FIG. 2 shows the device for clamping the end of a cloth web 58 on the cutting table. A vertically adjustable angle member 84 is fixed on the cutting table 28 at the clamping point and fitted thereon is a tong-like clamping bar 86 which can be pressed down and closed or raised and opened with the aid of a lever 88.

The whole apparatus is electrically and electronically controlled. The controlling mechanism comprises a stationary switchboard which is connected to the apparatus by cables 44, a switch box 42 on the spreading machine 30, a switch box 90 (FIG. 1) at the clamping point on the cutting table 28, a switch box 92 (FIG. 1) including a preselector potentiometer 93 on the support 22 and other control elements distributed over the apparatus, which will now be described with reference to FIG. 1.

At a suitable place on the circulating conveyor a follow-up counting potentiometer 94 is fitted. With the aid of limit switches 96 and 98 and cams 100 mounted on each of the cloth bolt suspending devices, the bolts are counted and controlled, one cloth bolt 26 being arbitrarily given the designation "zero." The follow-up potentiometer 94 cooperates directly with a preselector potentiometer 93 arranged in the switch box 92.

By this combination the stopping point for the bolts 26 is set between the two limit switches 96 and 98 and located directly above the zero point (threading or intake point) of the spreading machine 30 and the cutting table 28.

A cloth bolt suspending device is now described with reference to FIGS. 11 to 14. The longitudinal girder and the supports of the circulating conveyor are composed of channels 102 in which the chains 24 run. Connected in the strands of the chains 24, are carriages 104 which run on rollers 106. Each pair of opposite carriages 104 carries a cloth bolt suspension device. Each of these devices is composed of a lever 108 rigidly fixed on the carriage 104, and linked thereto is a lever 110 which is pulled into closing position on the rigid lever 108 by a spring 112. Each of these levers 108 has at its front end a trough 114 intended to receive the axle 118 of a cloth bolt. The cloth bolts wound on cardboard rolls 116 are slipped on the axles 118 on which cones 120 are mounted and the axles placed in the troughs 114. The levers 110 containing recesses 119 receive the ends of the axles 118 and lock them in position. To facilitate the introduction of the axles 118 into the troughs 114, the front ends 120 of the levers 110 are rounded. This is shown particularly clearly on the lower cloth bolts in FIG. 11 as well as in FIG. 13.

Figure 13:
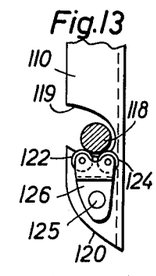
FIG. 13 is an enlarged view of the movable block of the holding device.
Figure 14:
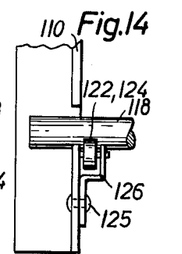
FIG. 14 shows the same block in front elevation.

FIGS. 13 and 14 show details of the lever 110. Two plastic rollers 122 and 124 carried by a block 126 are mounted adjacent the recess 119 of the lever 110 by means of a screw or rivet 125 and facilitate considerably the turning of the axle 118 loaded with the weight of a cloth bolt 26.

The device operates in the manner hereinafter described. The axle 118 is first slipped into the cardboard roll 116 of a cloth bolt 26 and onto a cone 120, and then a second cone 120 is pressed tightly from the other end against the other end of the cardboard roll 116, whereupon the two cones are fixed in position on the axle 118 by means of a set screw 127. The cloth bolt will then hang in the suspension device. In the form of construction illustrated in FIG. 1 this operation is carried out from the right end. The illustration in FIG. 11 corresponds to this position. When inserting the cloth bolts 26, the chains 24 are moved through the distance between two carriages 104. For this purpose the switch 128 can be used with which the driving motor 130 (FIG. 8) of the circulating conveyor can be controlled. When the circulating conveyor has been loaded, a protecting device 132 (FIG. 1) is closed in front of the filling end. This may assume the form of a pivoted frame, as diagrammatically shown, which can be locked. If the diameter of a cloth bolt is taken as being about 580 mm. and the length of the cutting table as being 11.5 meters, the circulating conveyor depicted by the drawings would be capable of carrying as many as 62 bolts of cloth.

It is assumed that the spreading machine 30 is in the zero position shown in FIG. 1. The preselecting potentiometer 93 on the switch box 92 is now set to indicate the cloth bolt to be selected. This bolt is then carried by the circulating conveyor above the spreading machine 30 to the zero point. The controlling device will determine in which direction the circulating conveyor must run in order to bring the desired cloth bolt 26 over the clamping point (zero point) of the cutting table 28 along the shortest path. For this purpose the controlling device compares the values indicated by the follow-up potentiometer 94 and the preselecting potentiometer 93. The circulating conveyor is then moved in one or the other direction by the motors 130, only one of which is shown. At the same time the follow-up potentiometer 94 counts the distance travelled and switches the circulating conveyor to a reduced speed shortly before it reaches the extreme position. Just before the cloth bolt 26 arrives at the clamping point, one of the two limit switches 96 or 98 is actuated. If the cam 100 of the preselected cloth bolt in moving from left to right runs against the switch 96, or past the switch 98 in running from right to left, the motors 130 are switched off. The bow 46 of the paying-out or spreading machine 30 is then swung upwards and the cloth web 58 pulled off the cloth bolt 26. The end of the web 58 is passed behind the guide roller 60 and pulled downwards until it comes within the range of the bow 46 and the pressure rollers carried thereby. The cloth web 58 is drawn past the open pressure rollers 52 and 56 and clamped by the clamping bar 86 at the end of the cutting table 28. The bow 46 is then tipped forward and fixed by the catch 50. If the cloth web 58 has to be pulled slightly upwards or downwards to adjust it, the pressure roller 54 is turned for this purpose with the aid of the handwheels 134 (FIG. 5) at its ends. The cloth web 58 can thus be easily threaded and adjusted into its proper position. The next operation is to set the length to which the cloth web is to be cut. For this purpose a tape measure 138 (FIG. 2) is displaced by a handwheel 136. This tape measure 138 runs along the cutting table in a guide 140 (FIG. 5). Above the handwheel 136 there is a window, not shown, through which the length shown on the tape measure 138 can be read. At the end of the tape measure 138 there is a cam 142 (FIGS. 2, and 5). As the handwheel 136 is turned, this cam 142 is pushed forward to the point where the spreading machine 30 is to stop. A limit switch 144 mounted on an arm of the spreading machine 30 cooperates with this cam.

After this operation the drive of the circulating conveyor and the spreading machine is switched on by pressing a selector button in the switch box 90. The spreading machine 30 and circulating conveyor (chains 24) then run up to the point determined by the cam 142 and there stop. Thereupon the knife 36 is switched on automatically by pressing another selector button and runs along in the knife carriage 34, thereby cutting off the cloth length.

When a length of cloth has been severed the spreading machine 30 returns into its initial position, automatically or on pressing a button by the operator. In case of automatic return movement, a limit switch is engaged by the spreading machine 30 on arrival at the end of the cutting table 28, which limit switch electrically initiates the return movement. Thereupon the knife carriage 34 is pushed upwards by the chain drive 38 a distance corresponding to the thickness of the cloth length. Thus a large number of cloth lengths can be superposed and cut, as can be seen from the illustration in FIG. 2. The cloth length actually uppermost is gripped under the clamping bar 86 while the cloth lengths already cut are held by the angle member 84.

The angle member 84 ensures that the individual cloth lengths are superposed so that their ends are flush with one another. The cloth lengths must, however, also be in alignment at the sides or edges. The operations explained below achieve this purpose.

The photoelectric cells 76 and 78 are arranged on the knife carriage laterally side by side on one side of the cloth web 58 and lamps 80 and 82 are arranged on the other side of the cloth web opposite their respective photoelectric cells. FIG. 5 shows only the photoelectric cells 76 and 78. The lamps 80 and 82 are in front of the plane of the drawing and therefore not shown in FIG. 5. In the position shown in FIG. 5, the left edge of the cloth web 58 runs exactly midway between the photoelectric cells 76 and 78 and is therefore in the correct position in a lateral direction. Should the cloth web 58 have wandered towards the right when being pulled off the cloth bolt 26, a light path will exist between the lamp 80 and the photoelectric cell 76 so that the cell is illuminated. This photoelectric cell 76 then energizes the magnet 68 connected with it, which causes the pressure roller 64 to swing about the rocker 72 on to the cloth web 58 and against the web guide surface 62. The cloth web 58 is then drawn towards the left since the pressure roller 64 is inclined. This sidewise pull ceases as soon as the web again covers the photoelectric cell 76.

In the normal position shown in FIG. 5, the photoelectric cell 78 is always illuminated by the lamp 82. In the event of the cloth web 58 creeping towards the left, it obstructs the light path between the cell and the lamp and the photoelectric cell 78 becomes dark. This then actuates the pressure roller 66 in a similar way to that described above in connection with the pressure roller 64 to shift the web to the right, until the photoelectric cell 78 is again exposed to light.

The spreading or laying machine 30 travelling on the cutting table 28 does not therefore carry the cloth along but serves merely as an abutment, that is, the cloth is deflected on to the cutting table 28 by the spreading machine. The further movement of the cloth bolt 26 and the cloth web 58 during the laying operation is effected by the circulating conveyor 20 (chains 24). The circulating conveyor lays the cloth web 58 on the cutting table 28 at the end of which it is clamped by the mechanism 84, 86, 88 (FIG. 2). The cloth web is thus pulled off the bolt. The drive of the spreading machine 30 is synchronized with the circulating conveyor and does not therefore serve for laying but merely for controlling the lateral position of the cloth web 58 by the edge thereof running between the photoelectric cells 76, 78 and the lamps 80 and 82.

There is also a limit switch 146 at the right-hand end of the spreading machine 30 and a zero abutment 148 cooperating therewith on the cutting table 28. The spreading machine 30 is stopped thereby when running back on the cutting table 28.

After a length of cloth has been pulled off the bolt and cut, the free end of the web hangs from its bolt 26. For rewinding this free end on its bolt 26, the rewinding device illustrated in detail in FIG. 2 is used. It is pivotally mounted on an upright 150 extending from the spreading machine 30. It consists substantially of a two-armed lever 152 on one free end of which a roller 154 (see also FIG. 5) is mounted which is driven by an electric motor 156. The weight of the electric motor 156 pulls the lever 152 into the inoperative or rest position shown in FIG. 2 in which it bears against a stop 158. It then presses against a contact 160, holding it open. When the driving roller 154 swings upwards, which is facilitated by the tension spring 162, the contact 160 is released and closes. As a result the electric motor 156 receives current and drives the roller 154. This is pressed against the bolt of cloth 26 located above it, imparting rotation thereto and thereby winding the free end of the cloth web on the bolt.

When laying or spreading the web of cloth 58 on the cutting table 28, the cloth itself is pulled so as to become smooth. Almost all kinds of cloth, however, possess different characteristics of expansion in width and length on account of their weave. In many cases the outer edge is longer than in the middle of the web. The opposite may also be the case. As a result the cut edge of a severed length of cloth will not be straight, but curved. This curvature, due to the structure of the fabric, is compensated according to the present invention in that the cloth web in being cut is curved in the opposite direction across its width at the knife carriage. This is attained by the devices illustrated in FIGS. 18, 19 and 20.

Figure 20:
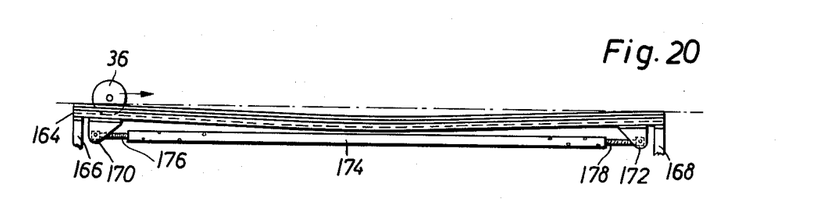
FIG. 20 shows the entire length of the counter knife or blade in operative position.

In front of the cutting knife 36 which is circular, a hollow rail 164 of U-shaped section is fitted on the knife carriage. This hollow rail 164 is fixed on the spreading machine 30 at two points 166 and 168 (FIG. 20). On the inner side of these points there are projections 170 and 172 on the hollow rail 164, between which projections a stretching rod 174 is arranged. Bolts 176 and 178 with screw threads of opposite pitch threadedly engage this stretching rod 174. By turning the stretching rod 174 the hollow rail 164 is bent about the points 166 and 168. In the position shown in FIG. 18 the edge of the hollow rail 164 remote from the knife is convex in relation to the cutting knife 36. The cloth web 58 is therefore held curved in front of the knife 36 and any curvature due to the structure of the weave is compensated.

Figure 18:
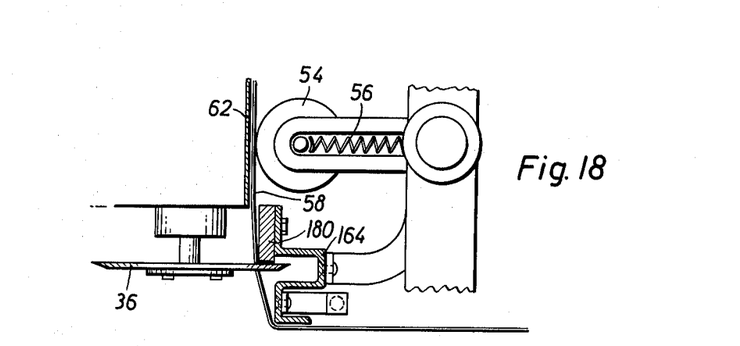
FIG. 18 shows on a larger scale, partly in section, a portion of the knife carriage with the cutting knife, the cloth web, the counter blade and a pressure roller.

It is therefore possible by turning the stretching rod 174 in one or the other direction and thereby bending the hollow rail 164 to assume a concave or convex shape, to counteract curvatures in the cloth web in one or the other direction.

Figure 19:
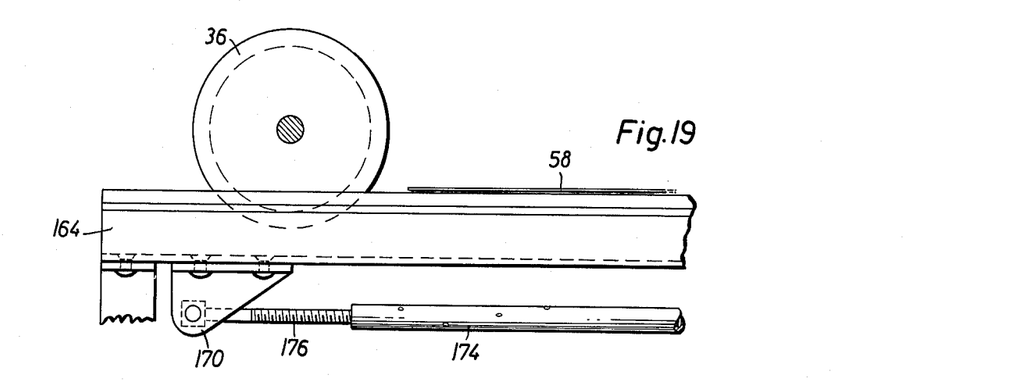
FIG. 19 is a part top plan view of the cutting knife and an end of the counter blade shown in FIG. 18.

The device illustrated in FIGS. 18, 19 and 20 is also characterized by a counter blade 180 fitted on the upper edge of the hollow rail 164. In known cutting devices, a cutting blade corresponding to blade 36 hangs freely in a hollow rail such as rail 164, and coarse or rough pile fabrics with thick weft threads yield in front of the knife and move into the space between the arms of the hollow rail 164. By the counter blade 180 provided according to the present invention, the cloth web 58 is fed to the cutting knife 36 and must be engaged thereby. The resiliently mounted pressure roller 54 is located directly above the counter blade 180 and guides the cloth web 58 against it.

By the arrangement shown in FIGS. 18, 19 and 20 a straight and reliable cut is obtained in the case of cloths with any kind of weave.

During the circulation of the conveyor (chains 24) and the pulling of the cloth webs off the bolts by the spreading machine, the bolts must be held under a certain pressure to prevent the webs from unwinding by themselves and to maintain the cloth webs 58 under tension while being pulled off the bolts by the spreading machine. To attain this, each bolt is provided with a brake which is mounted on its rigid lever 108 on the conveyor.

The brake comprises arms 182 on which a bow 186 is pivotally mounted. The bow 186 is loaded by a spring 188 bearing against the arms 182 and pressing the bow 186 and consequently the rod 190 extending across the entire width of the bolt against the cloth. This rod 190 brakes the bolt. The spring 188 is rendered adjustable in a suitable fashion so that the pressure exerted by the rod 190 can be regulated.

Figure 3:
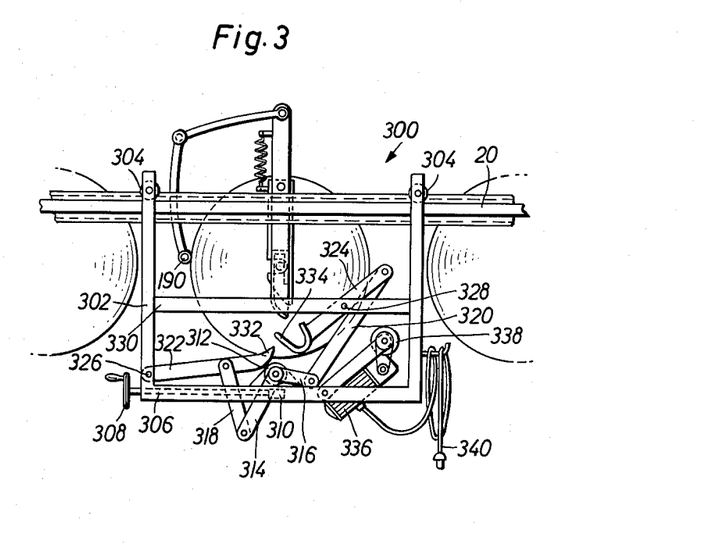
FIG. 3 shows a structure for removing braking pressure from the cloth bolt when a web is pulled off, in position of rest.
Figure 4:
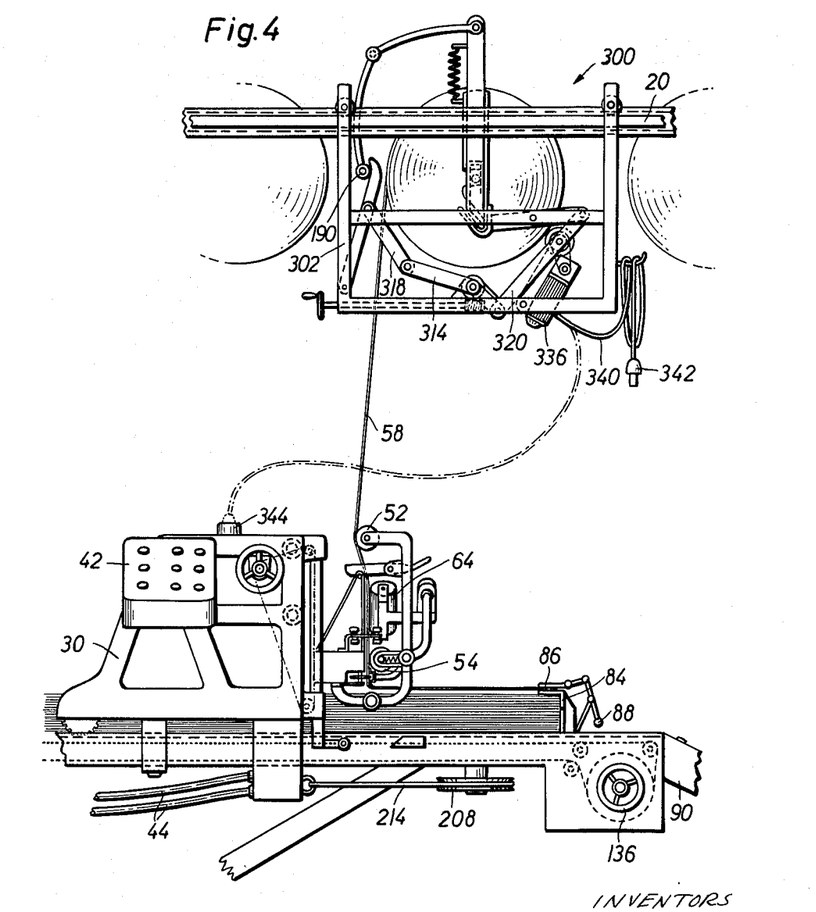
FIG. 4 shows said structure in operative position.

In FIGS. 3 and 4, there is illustrated an apparatus to be used in connection with the spreading machine 30 to pay out the cloth webs on the cutting table 28. The apparatus which is generally indicated at 300 serves to release braking pressure from the cloth bolt applied to it by rod 190. FIG. 3 shows apparatus 300 in position of rest when not in use and FIG. 4 shows the apparatus 300 in operative condition.

The apparatus 300 comprises a frame like carriage 302 movably supported by and guided on the girder 20 by means of rollers 304 on either side of the conveyor and of the apparatus respectively. A spindle 306 carrying a manually operated handle wheel 308 at its outer end is rotatably mounted on the lower side of the carriage 302. A gear 310 is secured to the inner end thereof and is in engagement with a worm gear 312 extending perpendicular to the direction of movement of carriage 302. Rigidly fastened to the worm gear 312 are levers 314 and 316 which act through intermediate levers 318 and 320 respectively on levers 322 and 324. Lever 322 is pivotable about an axis 326 mounted at the left hand side of carriage 302, and lever 324 is pivoted about an axis 328 secured to a horizontal member 330.

The outermost end 332 of lever 322 is designed such that it is adapted to engage rod 190 from below and force it away from the cloth bolt 26, as best apparent from FIG. 4. Lever 324 carries a channel shaped member 334 at its outermost end adapted to engage the lower end of lever 110 carrying the cloth bolts 26.

When not in use, the apparatus 300 is positioned at any desired spot of the girder, preferably at one end thereof. Of course, the apparatus 300 is designed such, that it does not interfere with and impede free movement of the cloth bolts 26 when moving along the girder 20. Further, the lever arrangements as depicted in FIGS. 3 and 4 and described above, are provided at either side of the girders 20.

Thus, for example, two levers 322 engaged rod 190 at each end thereof and two channel shaped members 334 are provided at opposite ends which engage the levers 110, one at each end of the respective cloth bolt 26.

When a selected desired cloth bolt 26 is automatically moved above the zero point of the cutting table 28, the apparatus 300 must once be manually moved into the same position shown in FIG. 3 in which it surrounds the selected cloth bolt 26 from either side and from below.

On rotation of wheel 308 the various levers are moved from the position shown in FIG. 3 into the position shown in FIG. 4. By engagement between the channel shaped members 334 and the lower ends of levers 110, both structures are connected with each other for common movement along the girders 20. The outermost ends 332 of levers 322 then engage the rod 190 on either side thereof from below and urge it away from the cloth bolt 26, thus removing braking pressure therefrom. The cloth bolt 26 is free to rotate and pay out the outermost layer of the cloth web from its periphery to spread it upon the cutting table 28 in cooperation with the spreading machine 30 when moved by the chains 24, no braking pressure being applied to the cloth bolt.

An electric motor 336 is pivotally secured to the lower frame member of the carriage 302. The electric motor 336 is intended to impart rotational movement to a roller 338 which extends over the entire length of the cloth bolt 26. The roller 338 serves to rewind the free end 58 of a cloth web back on the bolt 26, after a length of cloth has been pulled off and severed therefrom, the free end of the web hanging from the bolt.

The motor 336 receives electric driving energy through a cable 340 which may be electrically connected to the spreading machine 30 by means of a plug 342 to be inserted into a socket 344 on the spreading machine 30. For rewinding the cloth bolt, the motor 336 is pivoted in a counterclockwise direction until the roller 338 engages the periphery of the cloth bolt 26.

Figure 11:
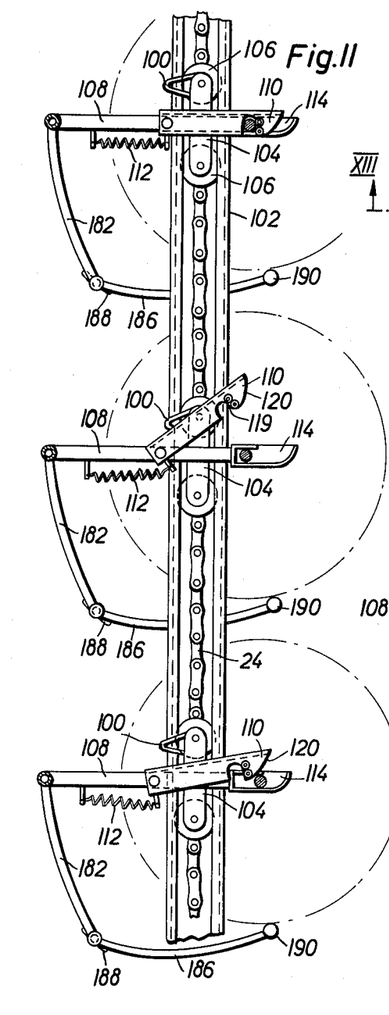
FIG. 11 is a side view of the chain of the circulating conveyor running in a support with holding devices for the bolts of cloth in the position for receiving the bolts of cloth.
Figure 12:
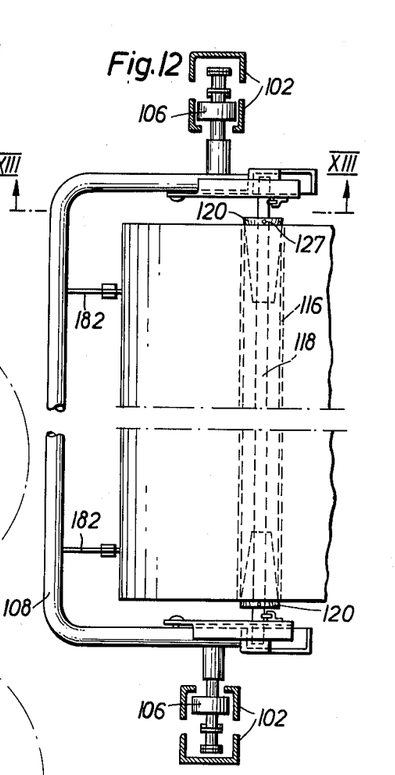
FIG. 12 shows a bolt of cloth hanging in a holding device.

The apparatus 300 as described above is used in connection with the braking arrangement depicted in the upper portion of FIG. 2 and in FIG. 11, and replaces the rewinding arrangement 152–162 as specifically depicted in FIG. 2.

When a web of cloth has been pulled off from the selected bolt and after rewinding of the free suspending end thereof in the manner described above, the apparatus 300 may remain connected to said bolt 26 by engagement of the channel shaped members 334 and levers 110. Said bolt 26 may then be returned to the zero point above the cutting table 28 together with the apparatus 300, by driving connection with the chains 24. The apparatus 300 is then released from the bolt by rotating the handle wheel 308 and the apparatus is then again in its position of rest ready for cooperation with the bolt selected next.

FIG. 21 shows the mechanism for guiding the spreading machine 30 on the cutting table 28. The spreading machine runs on pinions 192 engaging in toothed racks 194. Such a rack and pinion gear is necessary because the spreading machine 30 has to exert a certain force for pulling the cloth web off a bolt and it is essential for the circulating conveyor (chains 24) and the spreading machine 30 to run in synchronism. If ordinary wheels running on smooth rails were used there would be too much slip.

Figures 15, 16, 17:
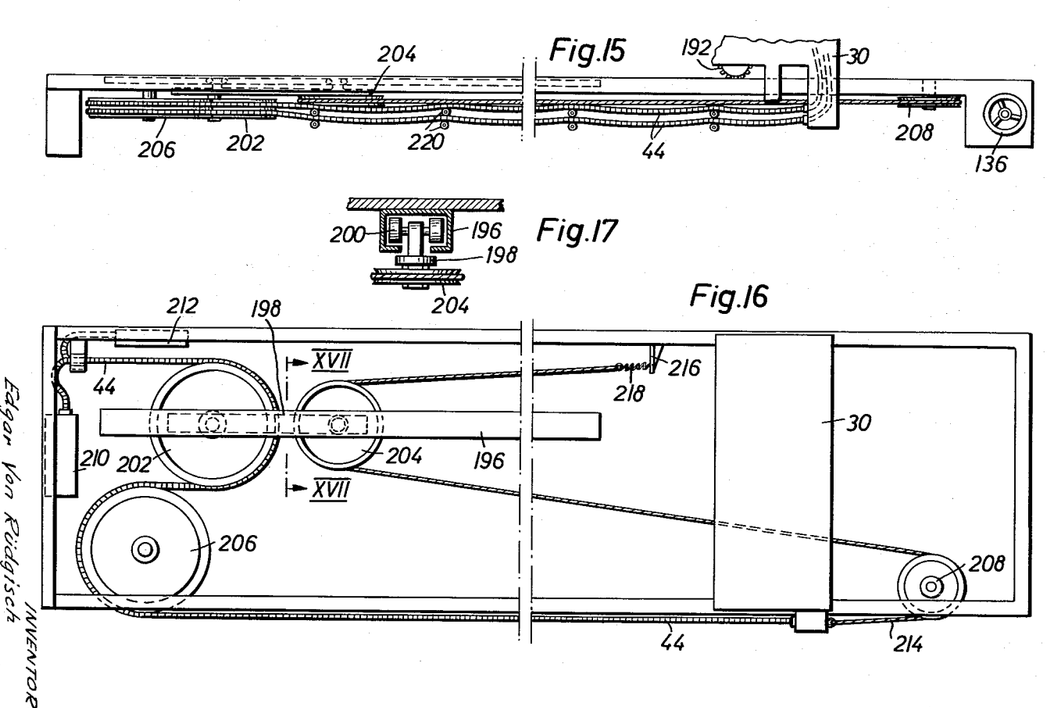
FIG. 15 is a side elevation showing the lower edge of the cutting table with cable guide.
FIG. 16 is a top plan view showing the guiding of the cables to the cutting table, but without the table top.
FIG. 17 is a section taken on line XVII—XVII of FIG. 16.

FIGS. 15 to 17 show the guiding arrangement for the cables for controlling and feeding the spreading machine 30. Cable carriers running on a guide are known for connecting cables to mobile current consumers. These cable carriers carry the cables and when the carriers are brought together the cables hang in the form of loops. When the current consumer is at a distance from the source of current the cables are stretched taut between the carriers drawn apart. In the case of a machine which is only a short distance above the ground and is located directly in the range of work, such suspension with hanging cables is open to serious objections. These are avoided according to the invention by mounting and guiding the cables under the cutting table.

Under the cutting table 28 a guide 196 is fitted in which a carriage 198 is suspended on wheels 200. The carriage 198 carries a larger guide pulley 202 and a smaller guide pulley 204. Two stationary guide pulleys 206 and 208 are also arranged underneath the cutting table 28. One or more cables 44 are connected to a terminal box 210 which in turn is connected with a control switchboard in a manner not illustrated. The terminal box 210 serves for connecting of the motors. The cable 44 runs from the terminal box 210 over the shiftable guide pulley 202 and the stationary pulley 206 to the spreading machine 30. In an extension of the cable 44 there is a rope 214 which runs over a stationary pulley 208 and the shiftable guide pulley 204; from there the rope leads to a clip or terminal 216 to which it is connected by a spring 218.

While the spreading machine 30 is moving to the left, the carriage 198 runs to the right so that the length of cable 44 becoming free through the movement of the carriage towards the right, is taken up. If the spreading machine 30 travels towards the right, the carriage 198 will run towards the left and release the cable 44. On the path between the guide pulley 206 and the spreading machine 30, the one or more cables 44 run over stationary pulleys or rollers 220 as shown in FIG. 15.

Figure 6:
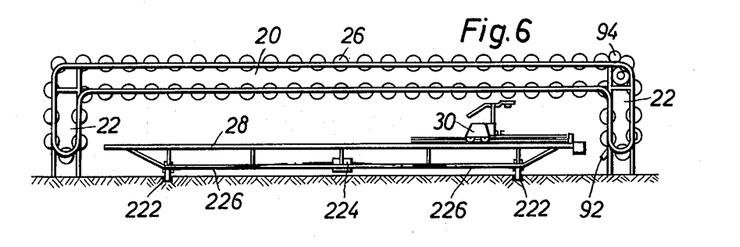
FIG. 6 is a general view of the apparatus seen from the side and shows the cutting table between the supports and below the longitudinal girder of the circulating conveyor.

FIG. 6 shows on a smaller scale a general view of the cutting table 28 with the spreading machine 30 located under the circulating conveyor 20, 22. This cutting table can be moved in a lateral direction on the rails 222. A drive motor 224 is provided which drives the wheels running on the rails 222 through the intermediary of shafts 226.

Figure 7:
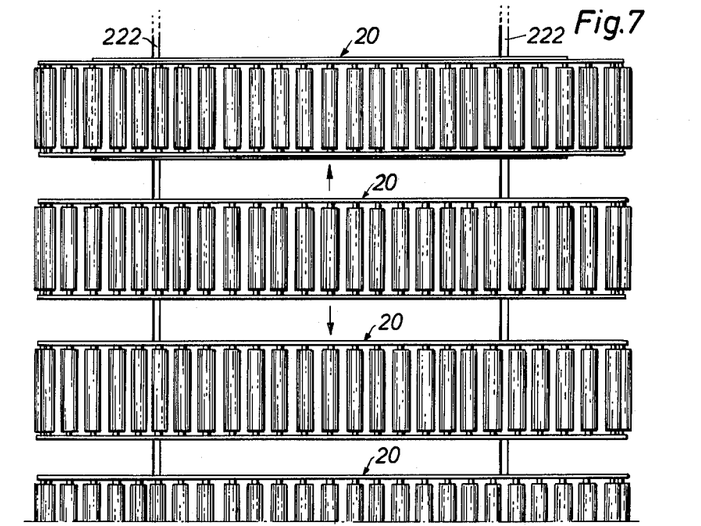
FIG. 7 is a top plan view of several circulating conveyors arranged side by side, under which the cutting table with the paying out machine can be selectively positioned.
Figure 8:
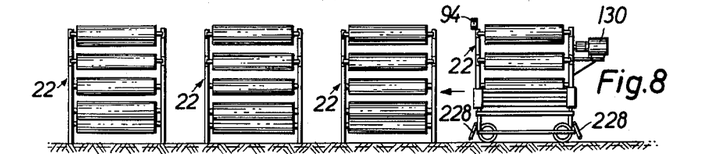
FIG. 8 is an end view of FIG. 7 and shows the cutting table in position under the circulating conveyor farthest to the right.

A laterally displaceable cutting table 28 of this type can be arranged under several circulating conveyors 20, 22 located side by side in the manner illustrated in FIGS. 7 and 8. A common cutting table will then be fed from several circulating conveyors. The storage capacity of a plant of this description will thus be increased by the number of circulating conveyors running side by side. The control is again effected by electrical means. For this purpose, for example, the switch boxes 92 provided on each circulating conveyor are connected in parallel and have additional switches for the drive of the motor or motors 224.

In the case of the cutting table 28 shown in FIG. 8, rods 228 pivoted at their upper ends extend along the two bottom edges of the table. These rods 228 cooperate with suitable contacts located in the current leads to the motor 224. If when moving sideways the cutting table 28 encounters any obstruction or runs against a person working in the vicinity, the rods 228, on coming in contact with the obstruction or person, will swing about their pivot point and immediately switch off the motor 224.

Figure 9:
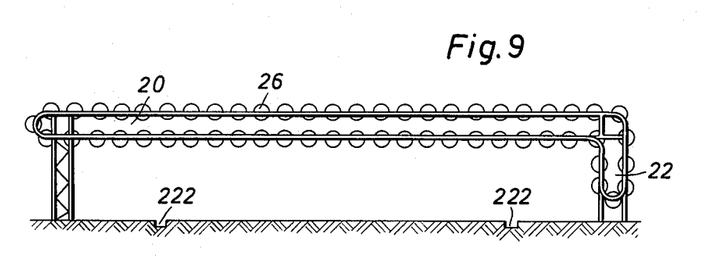
FIGS. 9 and 10 are side elevations depicting modifications of the circulating conveyor.
Figure 10:
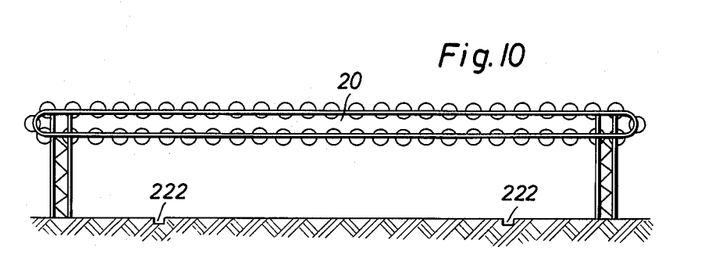

FIGS. 9 and 10 show modified arrangements for the circulating conveyors. In the case of the arrangement shown in FIG. 6, the chains carrying the cloth bolts 26 run along longitudinal girders 20 and up and down the two vertical supports 22. In this construction the cloth bolts 26 are pushed into the circulating conveyor from one or both narrow sides of the supports 22. In the case of the construction shown in FIG. 9 the chains with the cloth bolts 26 are only guided up and down one support, while in the construction shown in FIG. 10 the chains with the bolts 26 only run along the longitudindal girder 20.

Figure 22:
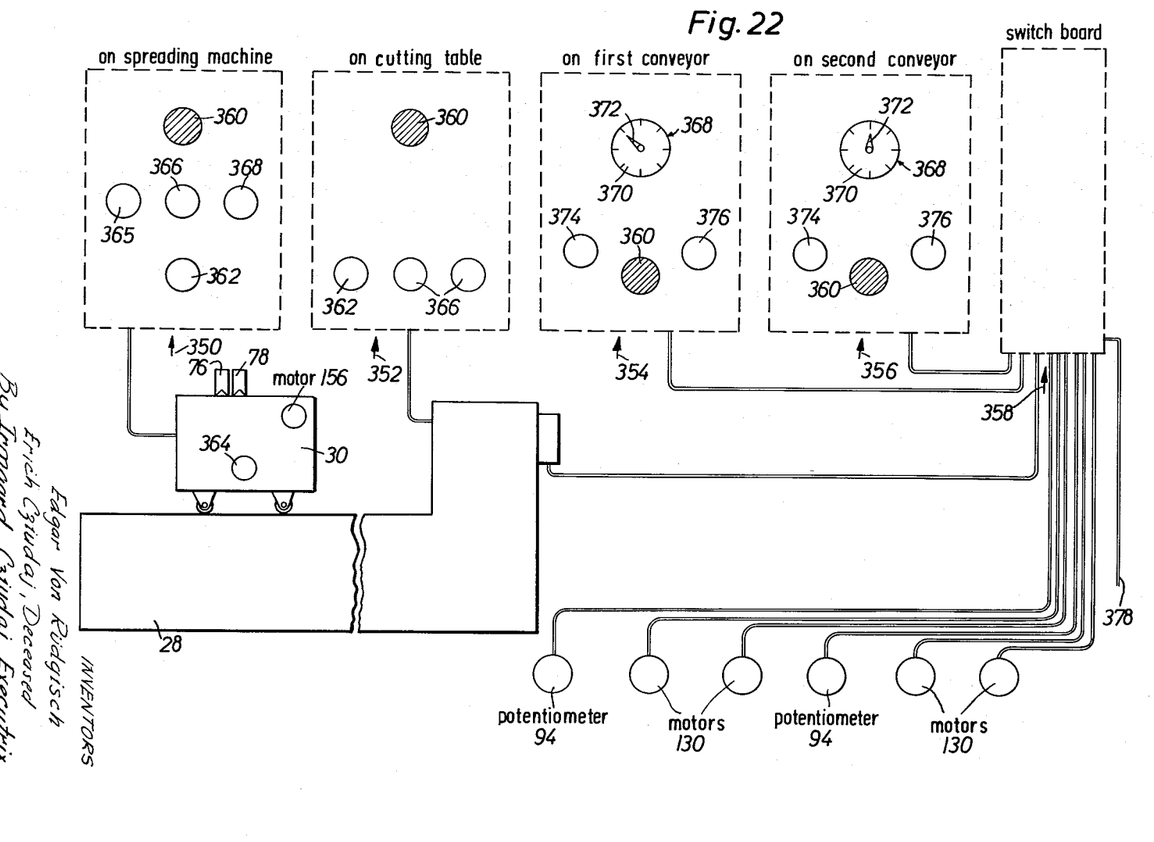
FIG. 22 is a diagram showing the electric controlling installation for the apparatus according to the invention.

The diagram of connections of the electric or electronic control installation is shown in FIG. 22. It shows from left to right the distribution of the switch boxes on the spreading machine, the cutting table, a first circulating conveyor and a second circulating conveyor. All connections are united in a stationary switchboard which is arranged outside the installation.

FIG. 22 also shows parts of the electric components of the spreading machine 30 in the middle on the left. The photoelectric cells 76, 78, the motor 156 for the rewinding device as well as the drive motor for the cutting knife 36 can be seen.

There are shown the switch box 350 on the spreading machine 30, the switch box 352 on the cutting table 28, a switch box 354 provided on a first conveyor, a switch box 356 provided on a second conveyor (several conveyors being possible as mentioned in connection with FIG. 7) and the stationary switch board 358 arranged outside the installation.

All switch boxes including the stationary switch board 358 have an "Emergency cut-out" button 360 by which the plant can be stopped instantaneously. There is a button 362 on the switch box 350 which actuates the drive 364 of the cutting knife 36. There are provided three further buttons on the switch box 350, which have the following functions: button 365 serves to start forward movement of the spreading machine 30, button 366 serves to stop movement of the spreading machine 30, and button 368 serves to start return movement of the spreading machine 30.

Buttons having the same functions are provided on the switch box 352 of the cutting table 28. They are not shown to avoid overburdening of the drawing. There is shown on the switch box 352 a button 362 for actuating the drive 364 of the cutting knife, and two buttons 366 which serve for selective movement of the bolts by the driven chains 24.

Switch boxes 354 and 356 are provided with selector switches 368 comprising a dial 370 and a pointer 372 which serve for selecting the bolt from which it is desired to sever a cloth web. For non-automatic operation, there are provided buttons 374, 376, which serve to start movement of the chains 24 transporting the bolts in one or the opposite direction.

On the switch boxes 354, 356, there is also provided an "automatic" switch (not shown), which allows the circulating conveyors to run automatically to the left or to the right in order to bring a selected bolt to the zero-point along the shortest path.

In the lower right-hand corner the circuit diagram shows that two motors 130 are provided for the drive of each of the circulating conveyors. One of these motors drives the circulating conveyor at high speed while the other motor drives it at slow or creeping speed. This renders gearing and a clutch unnecessary and yet enables the circulating conveyors to be started up at creeping speed, moved forward at high speed and then slowed down to creeping speed preparatory to stopping. Further shown are the follow-up potentiometers 94, one for each conveyor.

The stationary switch board 358 is connected to a supply of electric energy by a cable connection 378.

We claim:

1. Web handling apparatus comprising a conveyor having a flight extending substantially horizontally, means for driving said flight substantially parallel to a horizontal axis, a plurality of supports for bolts of material carried by said flight and extending transversely of said axis, a cutting table disposed below said flight and extending in the direction of said axis, means for securing an end of material from one of said supports to said table, a web spreading device horizontally movable along said table below said flight and engageable with material extending from said one support to said securing means to deflect such material towards said table, means for driving said device in the direction of said axis, and means for actuating said driving means for synchronously moving said flight and device in the same direction.

2. Web handling apparatus according to claim 1 wherein a toothed rack is mounted on said table and said device carries pinions engaging said rack.

3. Web handling apparatus according to claim 1 wherein said driving means are electrically coupled, said table carries an adjustable measuring stop to determine the length of travel of said device, and said device carries a limit switch in circuit with said driving means and engageable with said stop to deenergize said driving means.

4. Web handling apparatus comprising a conveyor having a flight extending substantially horizontally, means for driving said flight substantially parallel to a horizontal axis, a plurality of supports for bolts of material carried by said flight and extending tarnsversely of said axis, a cutting table disposed below said flight and extending in the direction of said axis, means for securing an end of material from one of said supports to said table, a web spreading device horizontally movable along said table and engageable with material extending from said one support to said securing means to deflect such material towards said table, means for driving said device in the direction of said axis, means for coupling said driving means for synchronously moving said flight and device in the same direction, means for selecting any of said supports to occupy a discharge station relative to said table, switching means in circuit with said flight driving means, and controlling means for operating said switching means when a selected support occupies said discharge station to deenergize said flight driving means.

5. Web handling apparatus according to claim 4 wherein said selecting means comprises a selecting potentiometer, and a follow-up potentiometer is in circuit with said flight driving means.

6. Web handling apparatus according to claim 4 wherein each said support carries an actuator, and limit switches in circuit with said flight driving means are disposed above said table in the path of each said actuator.

7. Web handling apparatus according to claim 6 wherein two limit switches are in circuit with said flight driving means, each of said switches responding to movement of said flight in one direction.

8. Web handling apparatus according to claim 4 wherein said flight driving means is reversible, and repsonds to said selecting means to move a selected support to said discharge station through its shortest path.

9. Web handling apparatus according to claim 4 wherein said flight driving means responds to said controlling means at high speed during starting and at reduced speed as a selected support approaches said discharge station.

10. Web handling apparatus according to claim 1 including a knife and a carriage therefor mounted on said spreading device, a frame pivotally movable relative to said carriage, a pressure roller on said frame for pressing material towards said carriage in an operative position of said frame, means for securing said frame in said operative position, said knife being circular and said frame carrying a member providing a channel receiving said knife, and a blade secured to said channel member engaging the upper surface of said knife, said blade being carried by said frame below said pressure roller and engaging the upper surface of said knife.

11. Web handling apparatus according to claim 10 wherein said pressure roller has an operative position opposite said carriage, a spring biases said roller towards said carriage, and a hand wheel is connected to said roller to effect feeding of a web of material.

12. Web handling apparatus according to claim 10 including adjusting means for varying the vertical position of said knife relative to said table.

13. Web handling apparatus according to claim 10 wherein said frame carries a channel member receiving said knife and a blade engaging the upper surface of said knife, and including means for bending said blade towards and from said carriage.

14. Web handling apparatus according to claim 1 including a knife and a carriage therefor mounted on said spreading device, a frame pivotally movable relative to said carriage, a pair of pressure rollers carried by said frame for pressing material towards said carriage in an operative position of said frame, a pair of photoelectric cells carried by said carriage between said rollers in spaced relationship on opposite sides of a path to be traversed by an edge of material to be handled, a pair of lamps supported opposite said cells respectively, and means responsive to said cells for adjusting said edge of material.

15. Web handling apparatus according to claim 14 wherein said responsive means comprises spaced adjusting rollers carried by said frame and having axes inclined to the axes of said pressure rollers for engagement with material being handled, and including magnets actuated by said photoelectric cells respectively, for shifting said material laterally.

16. Web handling apparatus according to claim 1 including a rewinding assembly carried by said spreading device below the path of said flight and movable for engagement with a bolt of material to impart rotation thereto.

17. Web handling apparatus according to claim 1 including a rewinding assembly carried by said spreading device below the path of said flight and movable for engagement with a bolt of material to impart rotation thereto, said assembly comprising a pair of levers pivoted near opposite sides of said spreading device, a driving roller journalled in said levers, an electric motor coupled to said driving roller, and means including said levers to elevate said driving roller into contact with a bolt of material on one of said supports.

18. Web handling apparatus according to claim 1 including a rewinding assembly pivotally carried by said spreading device below the path of said flight, said assembly comprising a drive roller engageable with a bolt of material to impart rotation thereto, a motor coupled to said driving roller, a stop normally supporting said assembly in an inactive position, and a switch actuated by elevation from said stop in circuit with said motor to rotate said drive roller.

19. Web handling apparatus according to claim 1 wherein said cutting table is provided with a vertically adjustable member of angular cross section for securing lengths of material to said table, and with a clamping bar movable towards and from said member for clamping an uppermost length of material to said table.

20. Web handling apparatus according to claim 1 wherein said conveyor is supported by longitudinal beams mounted on vertical columns, said beams and columns having cross sections of channel configuration with their channels proximately disposed, and said supports are provided with rollers and interconnected by chains received in and guided by said channels.

21. Web handling apparatus according to claim 1 wherein each support comprises a shaft, a pair of cones for engaging a bolt of material receiving said shaft, and means for securing said cones to said shaft.

22. Web handling apparatus according to claim 1 wherein each support comprises a carriage, an arm rigidly secured to said carriage and providing a trough, a shaft received in said trough, a lever pivotally carried by said arm, a spring biasing an end of said lever towards said trough, and rollers of plastic material carried by said lever for engagement with said shaft.

23. Web handling apparatus according to claim 22 wherein said rollers are carried adjacent an end of said lever, and said end is rounded to facilitate introduction of said shaft between said trough and lever.

24. Web handling apparatus according to claim 1 including a brake carried by each support extending transversely of said axis for engagement along the entire length of a bolt of material.

25. Web handling apparatus according to claim 24 wherein said brake comprises arms fixed to each pair of supports, a braking frame pivoted to said arms, and spring means biasing said braking frame into contact with a bolt of material on said support.

26. Web handling apparatus according to claim 1 including a terminal box fixed with respect to said table, feed and control cable means extending under said table and interconnecting said box with said spreading device, said cable means being threaded over a movable guide pulley and a stationary guide pulley, and a flexible member extending under said table interconnecting said spreading device with a point fixed with respect to said table, said flexible member being threaded over a stationary guide pulley and a movable guide pulley, and a carriage movable along the length of said table supporting said movable guide pulleys.

27. Web handling apparatus according to claim 26 including a track supported under said table and rollers supporting said carriage for movement along said track.

28. Web handling apparatus according to claim 26 including rollers carried by said table supporting said cable means intermediate the first said stationary guide pulley and said spreading device.

29. Web handling apparatus according to claim 1 including a plurality of similar conveyors arranged in side by side relationship for cooperation with a common cutting table, and means for moving said cutting table to a position below any of said conveyors for cooperation therewith.

30. Web handling apparatus according to claim 1 wherein a frame like carriage is movably mounted relative to said conveyor, said carriage being adapted to be manually connected to the support means of a selected bolt to be moved therewith, means on said support means to apply braking pressure to a bolt of material carried thereby, and means provided on the carriage to remove braking pressure from the bolt when a cloth web is pulled off therefrom and spread out on the cutting table.

31. Web handling apparatus according to claim 30 wherein the means to remove braking pressure from the bolt comprise levers on either side of the carriage engaging said braking means from below to urge it away from said bolt.

32. Web handling apparatus according to claim 30 wherein a rewinding roller is provided adapted to engage the periphery of said selected bolt along the entire length thereof to impart rotation thereto to rewind the free end of the web suspending from said bolt, said roller being driven by an electric motor receiving electric driving energy through a cable connection from the spreading machine.

33. Web handling apparatus according to claim 32 wherein said rewinding roller serves to apply slight braking pressure to said bolt when in operative position and in surface contact therewith, the rewinding roller being adapted to be moved into engagement and away from said bolt together with said braking pressure release means by said manually actuated means.

References Cited by the Examiner
UNITED STATES PATENTS

| | | | |
|---|---|---|---|
| 937,398 | 10/1909 | Weiss | 270—31 |
| 1,500,019 | 7/1924 | Wiesner | 83—650 |
| 1,826,135 | 10/1931 | Johnson | 83—649 |
| 2,441,791 | 5/1948 | Bostwick | 242—58.6 |
| 2,670,040 | 2/1954 | Sayles | 83—484 |

ANDREW R. JUHASZ, *Primary Examiner.*

J. B. McGUIRE, *Assistant Examiner.*